United States Patent [19]

Fuller et al.

[11] Patent Number: 5,205,693

[45] Date of Patent: Apr. 27, 1993

[54] QUICK RELEASE BOLT

[76] Inventors: S. Wyatt Fuller, 6289 NW. 62nd Ter., Parkland, Fla. 33067; John Suggs, 140 SW. 12th St., Pompano Beach, Fla. 33060; Salvatore Ambrico, 11680 NW. 24th St., Plantation, Fla. 33323

[21] Appl. No.: 881,238

[22] Filed: May 11, 1992

[51] Int. Cl.$^5$ .................. F16B 19/00; F16B 35/02
[52] U.S. Cl. ................. 411/354; 411/383; 411/348; 56/255
[58] Field of Search ............. 411/383, 384, 348, 351, 411/354; 285/315, 316; 56/255

[56] References Cited

U.S. PATENT DOCUMENTS

| 2,823,934 | 2/1958 | Gorrell et al. | 285/316 |
|---|---|---|---|
| 3,180,390 | 4/1965 | Ockert, Jr. | |
| 3,302,960 | 2/1967 | Herrmann | 287/119 |
| 3,390,712 | 7/1968 | McKay | |
| 3,444,773 | 5/1969 | Ligne | 411/354 X |
| 3,643,695 | 2/1972 | Strah et al. | 285/316 |
| 3,793,685 | 2/1974 | Knecht | 24/230 |
| 4,366,945 | 1/1983 | Blauenstein | 285/316 |
| 4,507,034 | 3/1985 | Lew et al. | 411/21 |
| 4,908,916 | 3/1990 | Berte | 24/453 |
| 4,913,610 | 4/1990 | Olivieri | 411/352 |

Primary Examiner—Neill R. Wilson
Attorney, Agent, or Firm—Oltman and Flynn

[57] ABSTRACT

A locking bolt apparatus includes a bolt having a fastening end with a circumferential channel around the fastening end, a bolt lock assembly including a cylindrical sleeve for receiving the fastening end of the bolt, the cylindrical sleeve having a pin slot angled with respect to the cylindrical sleeve longitudinal axis, a locking pin in the slot oriented perpendicular to the longitudinal axis of the cylindrical sleeve and having two ends extending beyond the slot, the pin positioned to laterally enter the circumferential channel, and an annular release member, slidably encircling the cylindrical sleeve, for engaging the two ends of the pin and pushing the pin out of the slot and out of the channel to release the bolt. Screw threads are preferably provided on the cylindrical sleeve, and an annular bolt adjustment member preferably surrounds the bolt adjacent to the cylindrical sleeve and has screw threads corresponding to and engaging the screw threads on the cylindrical sleeve, such that rotating the cylindrical sleeve in one direction elevates the bolt and rotating the cylindrical sleeve in the other direction lowers the bolt with respect to the annular bolt adjustment member. A spring-loaded washer is preferably provided around the cylindrical sleeve for biasing the pin into the slot.

3 Claims, 3 Drawing Sheets

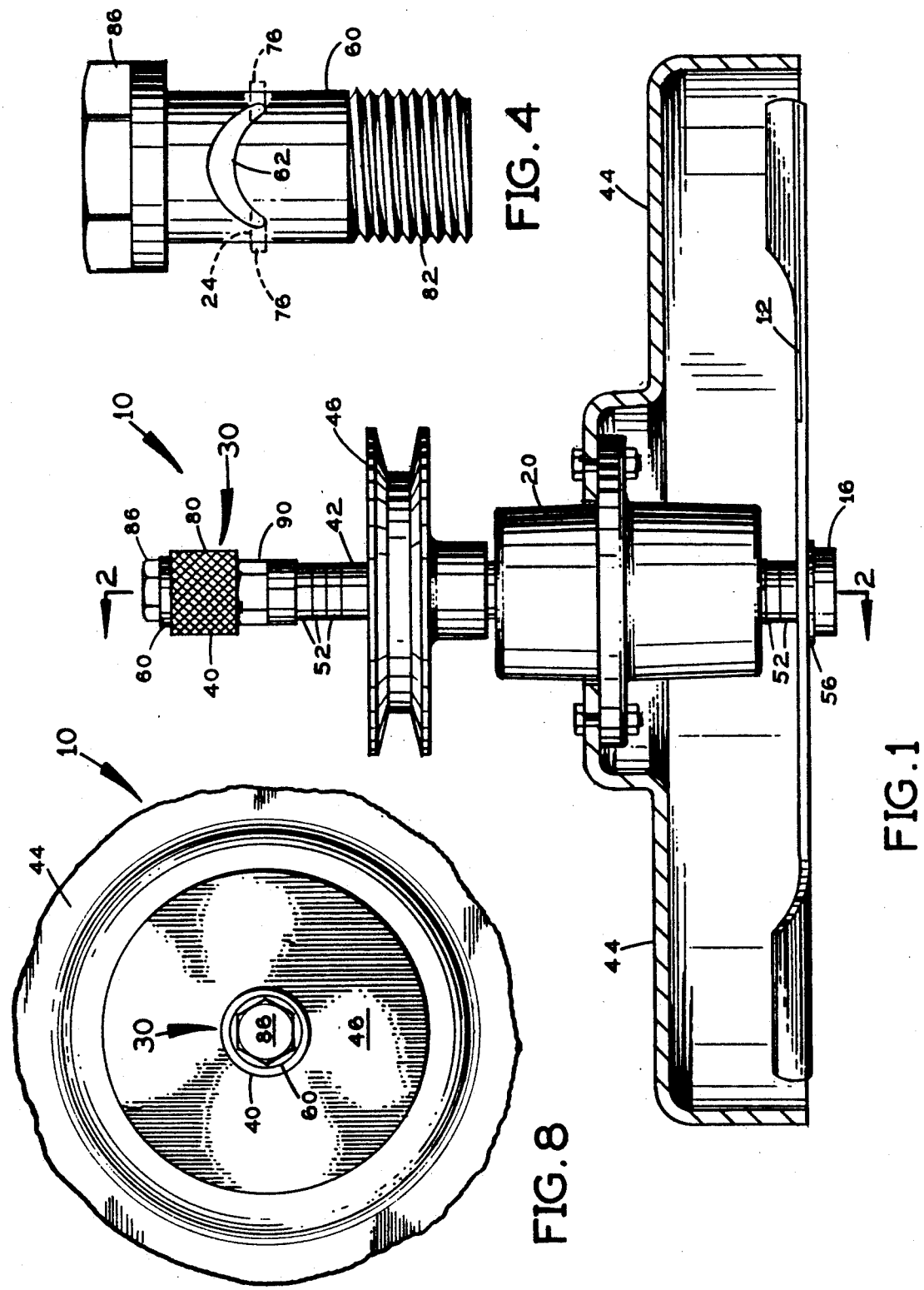

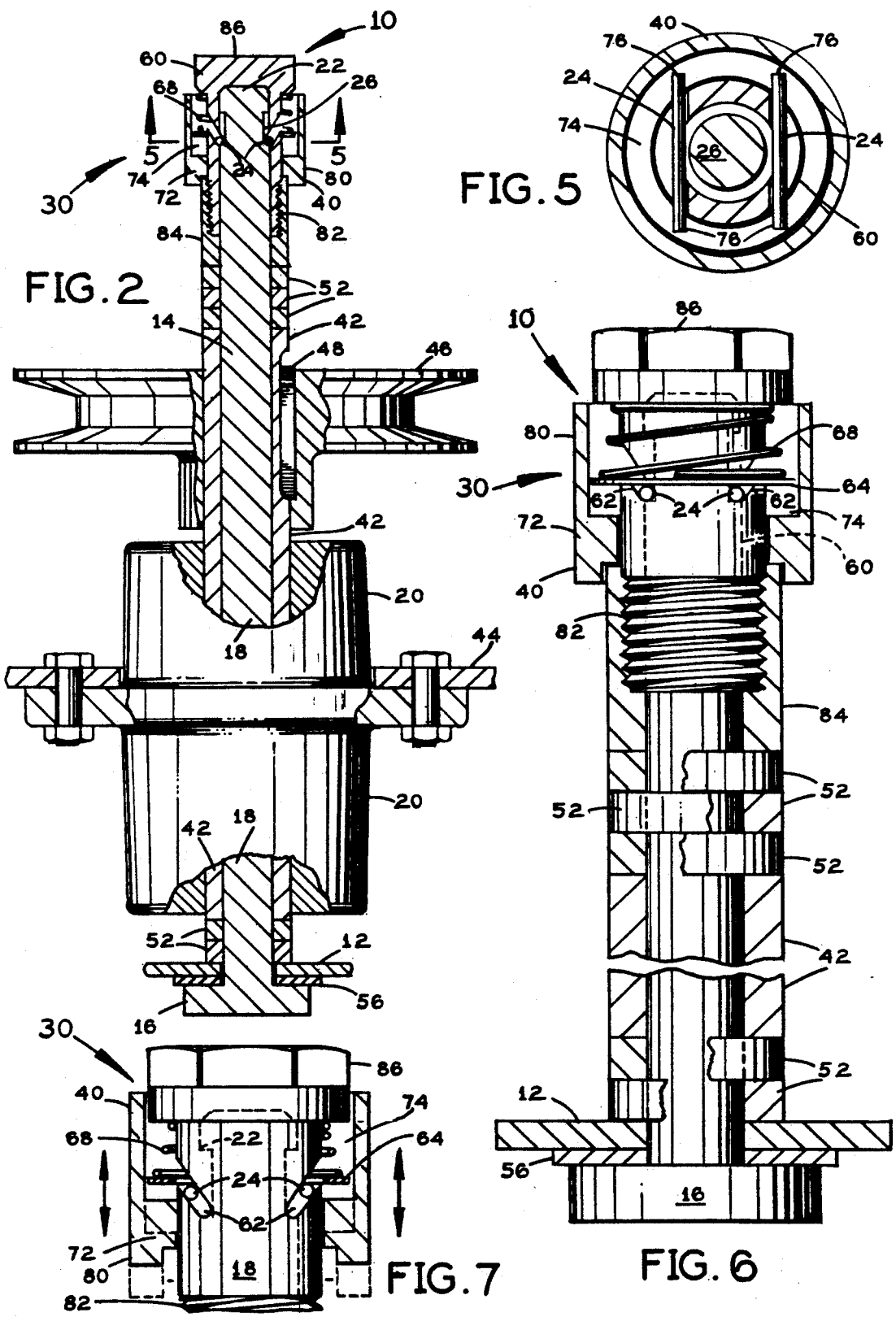

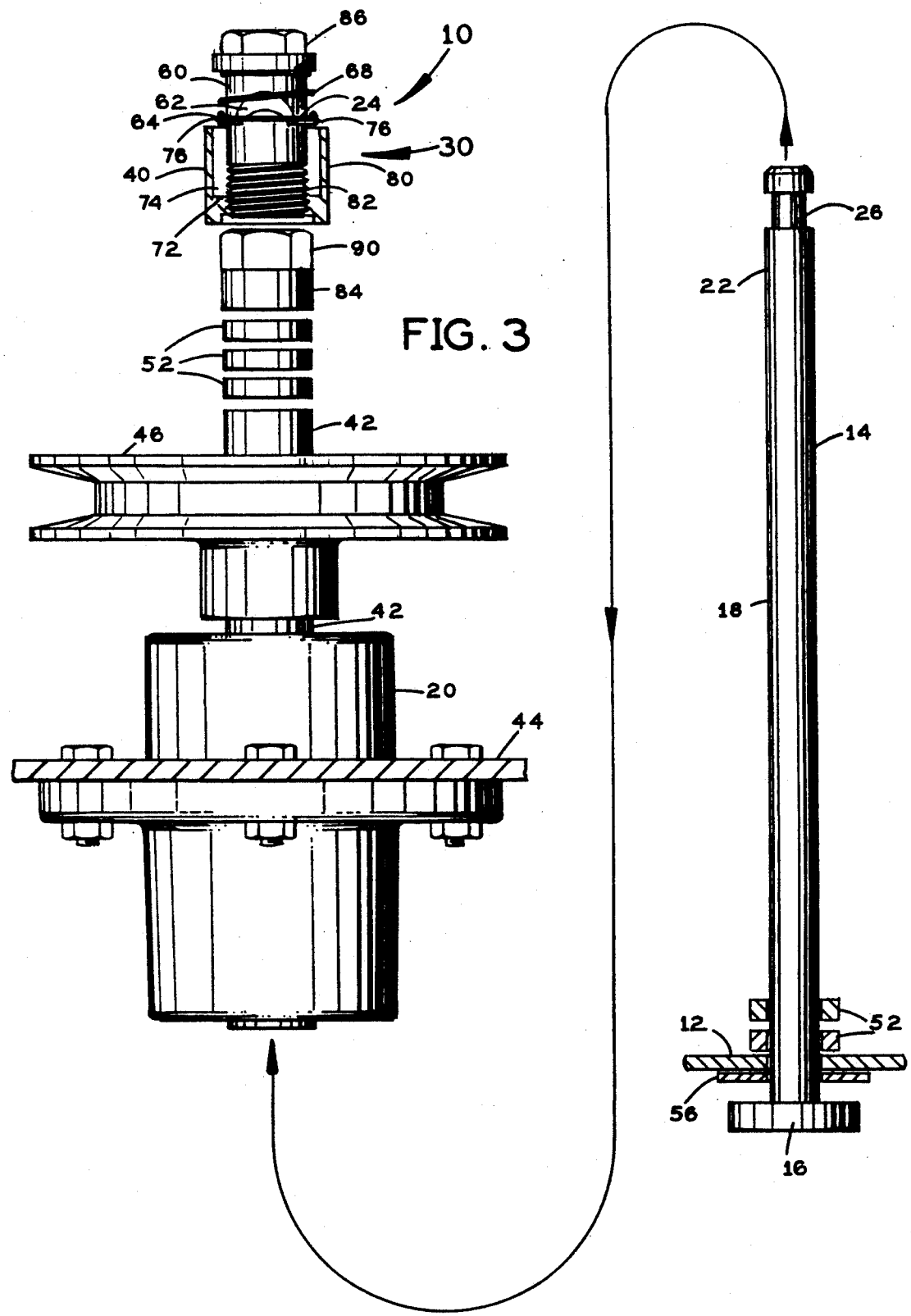

QUICK RELEASE BOLT

BACKGROUND OF THE INVENTION

1. Field of the Invention

The present invention relates generally to the field of self-locking fasteners, and more specifically to a bolt apparatus for mounting a lawn mower blade which can be quickly and safely disengaged from above the blade shroud by one person, said bolt apparatus including a bolt head for supporting the blade, a shank portion extending through the drive tube in the mounting spindle, and a threadless fastening end with a circumferential channel engaged by a bolt lock assembly, said bolt lock assembly comprising a cylindrical sleeve having opposing angled pin slots, a locking pin in each slot which laterally enters the bolt circumferential channel, a spring-loaded washer for biasing the pins into the slots, and a release member slidingly fitted around the sleeve for pushing the pins out of their slots and out of the channel, against the resistance of the spring-loaded washer, to release the bolt to drop out of the drive tube.

2. Description of the Prior Art

There have long been self-locking fasteners for various applications where either very reliable fastening or the ability to quickly disengage is needed.

Ockert, U.S. Pat. No. 3,180,390, issued on Apr. 27, 1965, teaches a locking bolt for connecting aircraft linkages, having an engaging end which protrudes beyond the linkages. The bolt has a diametrically oriented bore through its engaging end which contains two metal balls. These balls can be spread apart to extend half-way out of the holes and into a containing ring when the bolt is installed, to prevent the bolt from sliding out of its bore. An axial passageway within the bolt contains a spring-loaded, sliding shaft having a beveled, expanded section for camming the balls into and out of the locking position. The sliding shaft extends into a slot in the head of the bolt so that a screw driver inserted into the slot moves the shaft and cams the balls into an unlocked position. A castellated nut and cotter pin further secure the bolt. A problem with Ockert is that the entire locking apparatus is contained in the bolt itself, so that if the bolt fatigues or deforms, the entire apparatus must be replaced. Another problem is that, should the locking mechanism become jammed, the working elements are not accessible for servicing. Finally, the elaborate cam structure of Ockert would be costly to manufacture.

Herrmann, U.S. Pat. No. 3,302,960, issued on Feb. 7, 1967, discloses a locking device designed for virtually instantaneous release, designed for rocket launching applications. A shaft having a circumferential channel with beveled side walls fits into a bore in a member having a three radially oriented passageways extending through opposing walls of the bore. Each passageway contains two metal balls, each essentially matching the diameter of the passageway. A spring-loaded sleeve slidingly surrounds the outer openings of the passageways, has an inwardly directed flange of a width equal to the passageway diameter, and forms part of the passageway walls. The passageway is of a length such that both balls can fit within it only if the inner ball extends into the channel. Sliding the sleeve moves the flange, widens the outer portion of the passageway, and thereby permits the outer ball to move to one side and leave room for the inner ball to ride out of the channel, thereby freeing the shaft. A problem with Herrmann is that the passageways and channel must be cut to close tolerances to operate properly, making the device costly. And if one of the balls were lost during servicing, an exact duplicate would have to be found to fit properly.

McKay, U.S. Pat. No. 3,390,712, issued on Jul. 2, 1968, teaches a self-locking fastener similar to that of Ockert. The McKay fastener is a bolt containing an axial passageway and an elongate cam member. The cam member drives two spike members outward through radial bores to engage the outer face of the rearmost workpiece being fastened. An end of the cam member is exposed for operating the lock. McKay recites that a primary inventive feature is the making of line contact between the radially expanding members and the cam surfaces. A problem with McKay is that, once again, the entire locking mechanism is contained in the fastener itself, and if the fastener becomes worn or damaged, the user faces the expense of replacing the entire mechanism. Also, the mechanism is not readily serviceable.

Berte, U.S. Pat. No. 4,908,916, issued on Mar. 20, 1990, discloses a connecting pin device with a safety lock for coupling a tractor to a wagon. A cylindrical pin has a circumferential channel at one end which fits into a tubular locking mechanism having a series of balls positioned circumferentially around its exterior, and a hole adjacent to each ball. The mechanism receives the pin to a depth that aligns the channel with the holes. An outer sleeve having an interior cam surface is biased to slide axially along the mechanism to cam the balls part way through the holes and engage the channel. Pushing the sleeve in the opposite direction against the biasing releases the balls to move radially outward, unlocking the pin. A problem with Berte is that the locking ball arrangement is relatively expensive to manufacture.

Knecht, U.S. Pat. No. 3,793,685, issued on Feb. 26, 1974, teaches a coupling apparatus for the mooring of boats. Knecht provides an anchor member for bolting to a dock, having a protruding stud, and a stud locking mechanism at the end of the bow line. The structure of Knecht is much like that of Berte, providing a series of balls positioned adjacent to holes around the locking member, and an outer sleeve with a cam interior. Axially sliding the sleeve in one direction cams the balls through the holes and part way into the channel, to lock the stud in the mechanism. A spring-loaded plunger inside the mechanism pushes the stud out when the sleeve is slid in the opposite direction to disengage the lock. A problem with Knecht is that the elements of the structure must be carefully positioned to operate properly, and the ball arrangement is costly.

Lew, U.S. Pat. No. 4,507,034, issued on Mar. 26, 1985, discloses an expandable bushing and locking device for joining workpieces together. The structure is much like McKay in that a bolt is provided having an axial passageway and a sliding cam member within the passageway to drive locking elements radially outward, to protrude on opposing sides of the bolt. The problems presented by Lew are the same as those identified for McKay.

Olivieri, U.S. Pat. No. 4,913,610, issued on Apr. 3, 1990, teaches a device for preventing a wheel from slipping off an axle on which it is mounted, while permitting the wheel to rotate freely. A channel is provided around the end of the axle and an annular hub member is placed over the channel adjacent the wheel.

Then two securing plates radially slide into grooves in the hub member, and present concave edges to engage the axle channel. A problem with Olivieri, if applied to lawn mower blade bolts, is that it is by design difficult to remove, so that blade replacement would be unduly time-consuming and inconvenient.

It is thus an object of the present invention to provide a lawn mower bolt and lock apparatus which can be removed by a single person from above the blade shroud, to prevent injury by the blade.

It is another object of the present invention to provide such an apparatus which locks the bolt reliably and rotatably within the shroud spindle and permits quick and easy releasing and engaging of the bolt.

It is still another object of the present invention to provide such an apparatus wherein the locking elements are located in an assembly separate from the bolt, so that the bolt can be replaced without replacing the locking elements.

It is finally an object of the present invention to provide such an apparatus which is sturdy, easy to service and relatively inexpensive to manufacture.

SUMMARY OF THE INVENTION

The present invention accomplishes the above-stated objectives, as well as others, as may be determined by a fair reading and interpretation of the entire specification.

A locking bolt apparatus is provided which includes a bolt having a fastening end with a circumferential channel around the fastening end, a bolt lock assembly including a cylindrical sleeve for receiving the fastening end of the bolt, the cylindrical sleeve having a pin slot angled with respect to the cylindrical sleeve longitudinal axis, a locking pin in the slot oriented perpendicular to the longitudinal axis of the cylindrical sleeve and having two ends extending beyond the slot, the pin positioned to laterally enter the circumferential channel, and an annular release member, slidably encircling the cylindrical sleeve, for engaging the two ends of the pin and pushing the pin out of the slot and out of the channel to release the bolt. Screw threads are preferably provided on the cylindrical sleeve, and an annular bolt adjustment member preferably surrounds the bolt adjacent to the cylindrical sleeve and has screw threads corresponding to and engaging the screw threads on the cylindrical sleeve, such that rotating the cylindrical sleeve in one direction elevates the bolt and rotating the cylindrical sleeve in the other direction lowers the bolt with respect to the annular bolt adjustment member. A hexagonal head portion is preferably provided on the cylindrical sleeve and a hexagonal segment on the annular bolt adjustment member, to permit engagement by wrenches for rotation of the cylindrical sleeve relative to the annular bolt adjustment member. Also preferably provided is a spring-loaded washer surrounding the cylindrical sleeve for biasing the pin into the slot.

BRIEF DESCRIPTION OF THE DRAWINGS

Various other objects, advantages, and features of the invention will become apparent to those skilled in the art from the following discussion taken in conjunction with the following drawings, in which:

FIG. 1 a side view of the inventive locking bolt apparatus securing a lawn mower blade, showing the blade shroud in cross-section.

FIG. 2 is side view of the locking bolt apparatus securing a lawn mower blade, shown in cross-section except for the shroud spindle, revealing the operative elements of the locking assembly.

FIG. 3 is a side view of the locking bolt apparatus as in FIG. 2, except that only the release member is shown in cross-section, and the bolt is shown removed and positioned beside the locking apparatus and shroud spindle.

FIG. 4 is a side view of the sleeve only, having the optional hexagonal head and height adjusting threaded surface, and showing one of the pin slots, and showing a locking pin in the slot in broken lines.

FIG. 5 is a cross-sectional top view of the locking assembly, taken just above the pins, revealing the bolt, pins, sleeve and release member.

FIG. 6 is a cross-sectional close-up view of the locking assembly, showing the spring-loaded washer and the threads on the sleeve engaging threads inside the tube member for bolt elevation adjustments. Also shown are the three washers around the bolt below the locking assembly.

FIG. 7 is a cross-sectional side view of the locking assembly only.

FIG. 8 is a top view of the locking assembly and shroud spindle, showing the hexagonal head on the sleeve.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

FIRST PREFERRED EMBODIMENT

Referring to FIGS. 1 and 2, a quick release bolt apparatus 10 for mounting a lawn mower blade 12 is disclosed. Apparatus 10 includes a bolt 14 having a head 16 for supporting blade 12, a shank portion 18 extending through the mower mounting spindle 20, a threadless fastening end 22, and a bolt lock assembly 30. End 22 has a circumferential channel 26 engaged by lock assembly 30 with two pins 24 which are biased to laterally enter channel 26 to engage bolt 14. A release member 40 pulls pins 24 out of channel 26 to release bolt 14.

Spindle 20 is of a conventional design found on many existing lawn mowers, and is illustrated in FIG. 3. A drive tube 42 slidingly surrounds bolt 14, attaches to blade 12 and extends through spindle 20 toward lock assembly 30. Spindle 20 bolts to blade shroud 44, and a drive pulley 46 surrounds and is rotationally fixed with respect to drive tube 42 with a key 48. Three washers 52 are shown above and two washers 52 are shown below drive tube 42, encircling bolt 14. A large washer 56 is provided around shank portion 18 between bolt head 16 and blade 12 to securely retain blade 12.

Bolt lock 30 includes a cylindrical sleeve 60 for containing fastening end 22, having opposing angled pin slots 62 positioned to be adjacent to circumferential channel 26, and locking pins 24 which laterally enter each slot 62 to engage channel 26. See FIG. 4. Ends 66 of pins 24 protrude beyond the ends of slots 62. See FIG. 5. A washer 64 biased with a spring 68 pushes pins 24 into slots 62. A hollow, cylindrical release member 40 having an internal flange 72 slidingly fits around sleeve 60, with a gap 74 between its interior surface and sleeve 60. Flange 72 extends from release member 40 across gap 74 to make sliding contact with sleeve 60. See FIGS. 6 and 7.

Sliding release member 40 toward end 22 brings flange 72 to bear against pin ends 76 and presses pins 24 against washer 64, pulling pins 24 along and out of slots 62 against the resistance of spring 68. As pins 24 move apart and out of slots 62, they also move out of channel 26 and thereby disengage bolt 14. Pins 24 are slid back into slots 62 by washer 64 and spring 68, as soon as release member 40 is released. Bolt 14 is freed in this way to slide by its own weight out of spindle 20, releasing blade 12 for servicing or replacement. Release member 40 preferably has a knurled outer surface 80 for easy and sure gripping by the user.

Bolt 14 is replaced by simply sliding it back into spindle 20 and into sleeve 60. End 22 is beveled to slip between pins 24 and push pins 24 apart along slots 62, and then pins 24 automatically snap into channel 26 as a result of spring-biasing by washer 64. See FIGS. 2, 3 and 7.

To provide for adjustment of bolt 14 elevation within spindle 20, sleeve 60 has a threaded lower exterior section 82 which engages an internally threaded tube member 84 located between sleeve 60 and drive tube 42. See FIGS. 4 and 6. Rotating sleeve 60 in one direction lowers bolt 14 relative to shroud 44, and in the other direction raises bolt 14. A hexagonal head portion 86 is preferably provided on sleeve 60 and a hexagonal segment 90 on tube member 84 to permit convenient gripping by wrenches to make such height adjustments. See FIG. 8. It is contemplated that apparatus 10 may find application on many assemblies and structures other than lawn mowers.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim as our invention:

1. A locking bolt apparatus, comprising:
   a bolt having a fastening end with a circumferential channel around said fastening end,
   a bolt lock assembly comprising a cylindrical sleeve for receiving said fastening end of said bolt, said cylindrical sleeve having a pin slot angled with respect to said cylindrical sleeve longitudinal axis, a locking pin in said slot oriented perpendicular to the longitudinal axis of said cylindrical sleeve and having two ends extending beyond said slot, said pin being positioned to laterally enter said circumferential channel, and an annular release member, slidably encircling said cylindrical sleeve, for engaging said two ends of said pin and pushing said pin out of said slot and out of said channel to release said bolt, an annular bolt adjustment member surrounding said bolt adjacent to said cylindrical sleeve and having screw threads corresponding to and engaging said screw threads on said cylindrical sleeve, such that rotating said cylindrical sleeve in one direction elevates said bolt and rotating said cylindrical sleeve in the other direction lowers said bolt with respect to said annular bolt adjustment member.

2. An apparatus according to claim 1, additionally comprising a hexagonal head portion on said cylindrical sleeve and a hexagonal segment on said annular bolt adjustment member, to permit engagement by wrenches for rotation of said cylindrical sleeve relative to said annular bolt adjustment member.

3. An apparatus according to claim 1, additionally comprising:
   a spring-loaded washer surrounding said cylindrical sleeve for biasing said pin into said slot.

* * * * *